Sept. 27, 1966 R. C. FISCHER 3,274,925
VIBRATOR TYPE WAFERIZER
Filed Dec. 2, 1964 7 Sheets-Sheet 2

Fig. 2.

INVENTOR
RAYMOND C. FISCHER
BY Ralph Alvey
ATT'Y.

Sept. 27, 1966 R. C. FISCHER 3,274,925
VIBRATOR TYPE WAFERIZER
Filed Dec. 2, 1964 7 Sheets-Sheet 4

INVENTOR
RAYMOND C. FISCHER
BY Ralph Alway
ATT'Y.

Sept. 27, 1966 R. C. FISCHER 3,274,925
VIBRATOR TYPE WAFERIZER

Filed Dec. 2, 1964 7 Sheets-Sheet 6

INVENTOR
RAYMOND C. FISCHER
BY
Ralph Alvey
ATT'Y.

3,274,925
VIBRATOR TYPE WAFERIZER
Raymond C. Fischer, Hinsdale, Ill., assignor to International Harvester Company, Chicago, Ill., a corporation of Delaware
Filed Dec. 2, 1964, Ser. No. 415,380
26 Claims. (Cl. 100—186)

This invention pertains to a hay waferizer, in particular, to a three-stage machine for making hay wafers. The novel machine comprises: a high speed, rotary, double auger first-stage unit for continuously precompacting large quantities of hay to bale density; a reciprocatory-vibrator second-stage, piston-type wafer forming unit which superimposes a tamping action on the principal compressive action of the piston unit; and a retaining tube third-stage unit in which the wafers are subjected to pressure and the heat of compression so that they acquire a "set."

For mechanical handling of hay from windrow to feed bunker, hay wafers are advantageous because they are small and readily handled by conveyors of various types. Hay waferizing is not, however, trouble-free. Whole hay is tough and resilient and, hence, difficult to compress permanently. Hay is also very bulky, so that relatively large volumes of hay must be handled for each wafer made. Moreover, to produce the large compressive forces needed to waferize hay, a relatively heavy, reciprocable machine has heretofore been required. Such prior art waferizers have been characterized by great mass, high impact pressures at the dead center of the compression stroke, high power consumption, and low volume of wafer production.

OBJECTS

It is a purpose of the three-stage waferizer disclosed herein to overcome the above disadvantages, and to attain, among others, the following objects: First by using a rotary first-stage double auger precompaction unit, to provide a waferizer capable of handling large quantities of hay per unit of time; Second, by using a vibratory principle of waferizing, to provide a waferizer wherein less power is wasted in overcoming the tendency of hay to "breathe"; Third, by waferizing the hay in three stages and using for each stage a mechanism peculiarly suited for hay waferizing during that stage, to provide a light-weight waferizer having low power consumption; Fourth, by overcoming the resiliency of the hay with rotary and high frequency vibratory actions, to provide a light-weight, low power waferizer; Fifth, by using rotary and vibratory actions in the first two stages and producing a greater permanent set in these stages, to provide a hay waferizer requiring a shorter third-stage tube and, thereby, less power to complete the overall waferizing operation; Sixth, by doing work on each stroke of the double-acting second-stage piston unit, to produce a continuous power requirement, eliminating intermittent high peaks and the need for a large flywheel, thereby providing smooth, vibration-free operation; Seventh, by using two sets of double auger precompaction units, to divide the windrow for a duplex waferizing operation.

DRAWINGS

The best mode contemplated for carrying out the present invention is shown in the attached drawings, wherein.

DESCRIPTION

General

Hay waferizer 30 (FIG. 1) is a portable machine for waferizing hay in transit, that is, as the waferizer is drawn along a windrow of hay. Tractor 31 tows the waferizer by means of a hitch 32; the waferizer tows wagon 34 by its tongue 35. Power for running the waferizer is supplied by the tractor through power take-off 33. The principal components of the hay waferizer are a supporting structure, a hay pick-up mechanism, a three-stage hay waferizing, a hydraulic system, a wafer conveying mechanism, and a power train.

Supporting structure

The supporting structure comprises a chassis 37 (FIG. 2) suitable for carrying the pick-up mechanism, the waferizer, the power train, and the conveying mechanism. A hitch 32 (FIG. 1) for towing the waferizer is provided at the front of the chaissis; a hitch 39 for towing wagon 34 is provided at the rear of the chassis. The chassis is mounted on wheels 38 and 42, wheel 38 (FIG. 2) being located to the rear of the waferizer so that it will not run over and crush the adjacent row of hay and, also, to relieve the load on hitch 32.

Hay pick-up mechanism

Hay pick-up mechanism 40 (FIGS. 1 and 2), which is similar to the pick-up mechanism of a conventional hay baler, includes a housing, a pick-up reel, and a hold-down bar.

Housing 43 (FIGS. 1 and 2) includes a platform 45 and walls to the left, right, rear, and overhead. The housing is open to the front for admission of hay and is located forwardly on chassis 37 for access to the hay. Pick-up reel tines 41 (FIGS. 1 and 2) are mounted on shaft 47 (FIGS. 2 and 15) extending transversely of housing 43 along and below the forward portion of platform 45. A drive sprocket 180 (FIG. 15) is located at the inside end of shaft 47. Retractable tines 41 radiating from the reel move clockwise (FIG. 1) on rotation of shaft 47 and transfer hay from the ground onto platform 45 through the open front of the housing. Hold down bar 46 (FIG. 1) is pivotally attached to the right and left sides of the housing and extends transversely of and above platform 45 to direct hay entering housing 43 downwardly onto the platform.

Three-stage hay waferizer

The three-stage hay waferizer comprises a pair of double auger first-stage units for precompacting the hay to bale density, a double-acting reciprocatory-vibratory second-stage unit for forming the wafers, a retaining tube third-stage unit for fixing the wafer form, and a hydraulic system for supplying hydraulic fluid to the second and third-stage units.

The first-stage of the hay waferizer includes identical double auger units 55 (FIGS. 2 and 5) located at the rear of platform 45. Each double auger unit 55 comprises a hay compaction chamber 58 (FIG. 4) located below platform 45 and extending longitudinally thereof. Ingress to the chamber is through inlet opening 59 between the augers in platform 45; egress from the chamber is through discharge opening 66 (FIG. 6) at the rear of the chamber. Each double auger unit comprises a pair of augers 56 and 57, each including a shaft 60 (FIGS. 2 and 4) which is rotatably mounted below platform 45 and extends lengthwise of the chamber 58. The auger flights project slightly above the surface of the platform from the chamber 58. A drive sprocket 183 (FIG. 5) is located at the forward end of each shaft 60. The augers 56 and 57 have flights of opposite hand spirals, are timed about 180° apart for aggressive induction of hay into chamber 58, and are counter-rotating in the direction of the arrows in FIG. 5.

The second-stage unit 75 (FIG. 2) comprises a double-acting, piston-type wafer forming unit and a hydraulically actuated vibrator for superimposing a tamping action on the reciprocatory action of the double-acting piston unit. The second-stage unit lies athwart the waferizer 30 at the rear end of platform 45.

The double-acting, piston-type wafer forming unit (FIG. 6) includes a two-piece cylinder 76 joined at the flanges 77. Each flanged section of cylinder 76 is allochiral to that extending to the right of flanges 77 in FIG. 6. A slot extending longitudinally along the top of cylinder 76 provides an opening 71 for three hydraulic hoses (described below). The discharge openings 66 of the first-stage units empty into the cylinder 76 to both sides of the flanges 77 to pass hay from the first-stage to the second-stage. Each allochiral section of cylinder 76 has a waferizing portion 74 and a wafer-fixing portion 78. The waferizing portion extends from the opening 66 to the retainers 80. The wafer-fixing portion (described below as part of the third-stage unit) extends from the retainer 80 to the outer end of the slots 79.

A double acting piston and cross head assembly (FIGS. 6 and 7) is located inside cylinder 76. This assembly includes the hollow cross head 84 and the two identical piston heads 82, all of which are freely slidable in cylinder 76. The piston heads are pivotally connected at 69 to opposite ends of a connecting rod 83. Intermediate the ends of rod 83 and integral therewith is vibrator piston 70, which is reciprocable inside cross head 84.

Figure 2:
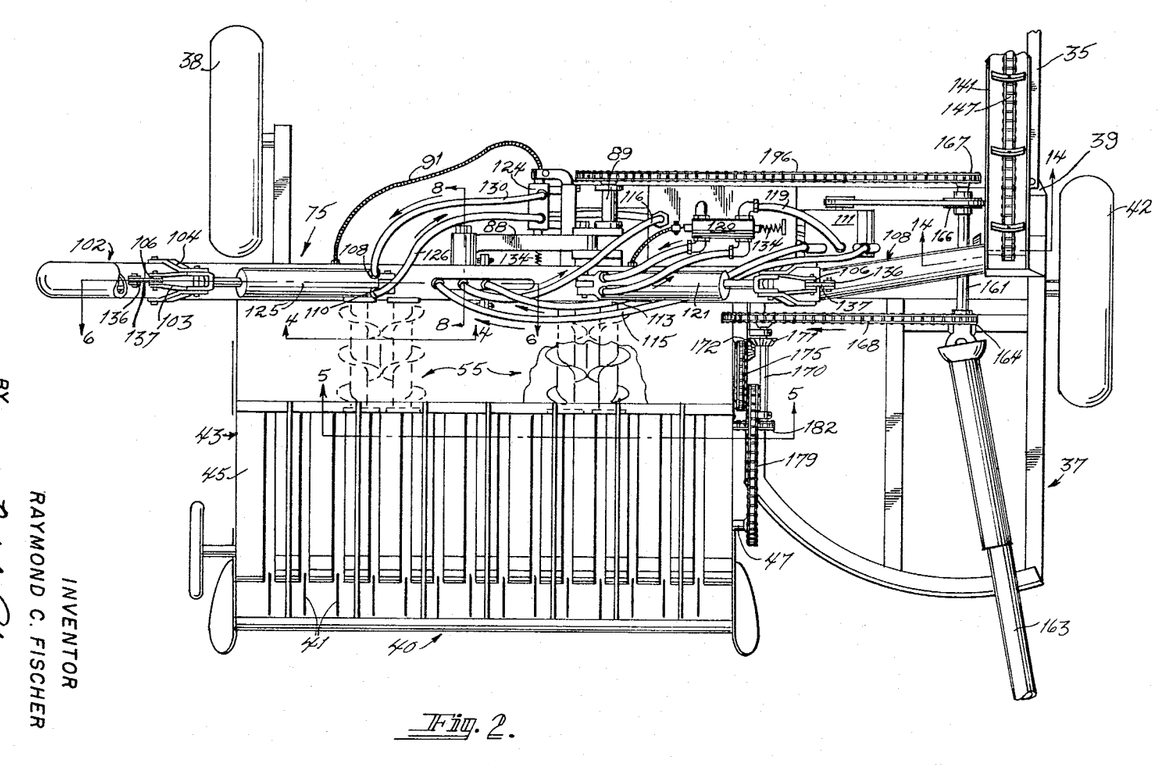
FIG. 2 is a plan view of the hay waferizer of FIG. 1, showing the general location of various major parts.
Figure 8:
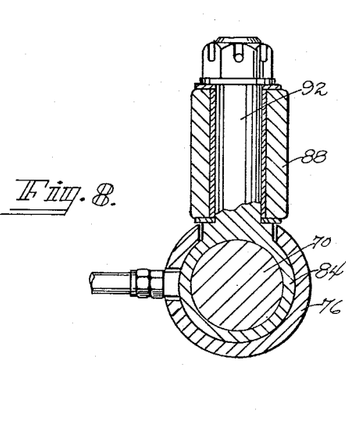
FIG. 8 is a section through the piston of FIG. 7, taken on line 8—8 of FIG. 2.
Figure 15:
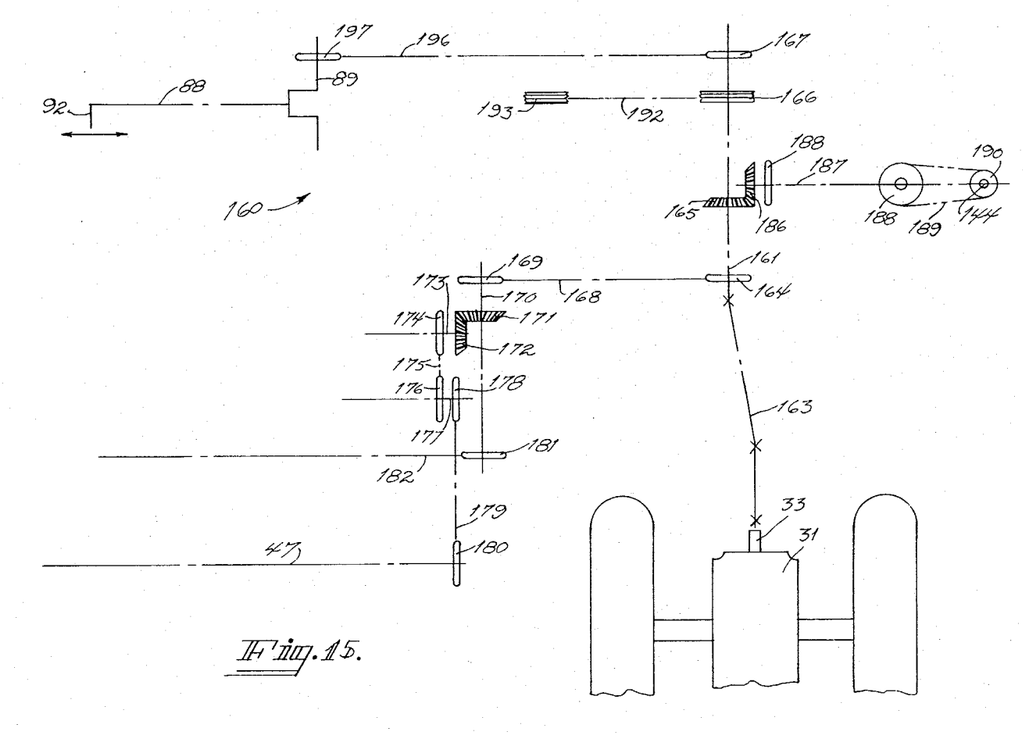
FIG. 15 is a diagram of the power train for the waferizer.

Cross head 84 comprises a hollow cylindrical body, the ends of which are closed by screw plugs 85. Each plug has a centrally located bore 86 through which rod 83 passes, a seal 87 in the bore preventing the escape of hydraulic fluid from inside the cross head. Three ports 62, 63 and 64 permit hydraulic fluid to flow into or out of the cross heads, as the case may be, through hoses 113, 115 and 116. Projecting to one side of the cross head is a crank pin 92 (FIG. 8) and crank arm 88, which is reciprocated by the crank of crankshaft 89 (FIGS. 2 and 15).

Adjacent the outer dead center position of each piston 52 is a plurality of retainers (FIG. 6) for preventing reverse movement of the wafers. These retainers comprise retaining elements 80, that project into the cylinder 86 through openings in its wall. Spring 81 holds the retainer in active position inside the cylinder but allows the retainer to yield to permit wafers to move towards the discharge of the unit.

The retaining tube third-stage units, as indicated above, form a continuation of the second-stage portion of the cylinder 76, that is, extend downstream of retainers 80 to the outer end of the cylinder slots 79. The slots 79 in the wall of cylinder 76 permits the size of the cylinder bore to be adjusted by toggle 96 (FIGS. 2 and 3) in order to vary the resistance to the flow of wafers.

The function of the third-stage retaining tube is twofold. First, by exposing the wafers to the repeated compressive forces applied by piston 82 as that piston gradually pushes the wafers out of tube 76, the third-stage tube imparts a "set" to the wafers. Second, by baking the hay sap freed during the prior operations of the hay, the third-stage unit converts the sap into a bond that helps to hold together the blades of hay forming the wafer.

Each toggle assembly 96 comprises an overcenter linkage and a hydraulic actuator for operating the linkage. The overcenter linkage (FIG. 3) includes a pair of short arms 103 and a pair of long arms 104. The long arms 104 are pivotally connected at one end to lug 105, which is rigidly connected to the bottom of wafer transfer tube 102. At their outer ends, arms 104 are connected to the U-shaped end of piston rod 98 of the actuator 125. The short arms 103 are pivotally connected at one end to lug 106, which is rigidly connected to the top of wafer transfer tube 102, and at their other ends to an intermediate point of the long arms 104. Because arms 103 and 104 pivot about different centers, clockwise movement of arm 103 in FIG. 3 causes the curved end 135 of the arm to act like a cam against the tube 76 and to squeeze the slotted cylinder sections together, thereby restricting the tube to the flow of wafers. Counterclockwise movement of arm 104 reverses this clamping action.

The hydraulic actuator 125 (FIG. 3) operates overcenter arms 104 to effect the clamping action described above. The actuator comprises cylinder 125, a double acting piston (not shown) on the inside of the cylinder, connecting rod 98, and hose connections 126 and 130 (FIG. 12) to the hydraulic system. One end of cylinder 125 is pivotally attached at 109 to the top of tube 78. Connecting rod 98 is pivotally connected to arms 104.

Hydraulic system

The hydraulic system (FIG. 12) contains three hydraulic circuits, one for the vibrator and one for each of the two hydraulic devices 121 and 125. Fluid under pressure is supplied by a swashplate type pump 111 having 8 cylinders. Three of the pump cylinders are connected by manifold 112 and hose 113 to one end of the cross head 84, to apply fluid pressure against one face of the double vibrator piston 81. Three other cylinders are connected by manifold 114 and hose 115 to the other end of cross head 84, to apply fluid pressure against the other face of piston 81. Vibrator return hose 116 leads from the middle of cross head 84 to a fluid sump 117. Pump 111 draws make-up fluid from sump 117 through line 118.

Figure 12:
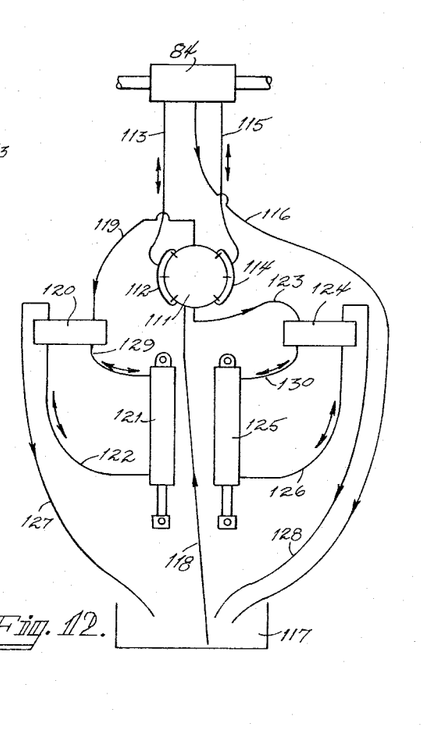
FIG. 12 is a piping diagram of the hydraulic system used with the vibrator of FIG. 6 and the hydraulic actuators of FIG. 3.

Each piston of a three-piston group is on a suction stroke for 180° of the pump swashplate rotation and on a discharge stroke for the other 180° of pump swashplate rotation. On its suction stroke, each piston of a group draws fluid from the associated vibrator cavity and, if necessary, takes make-up fluid from the sump 117 through the line 118. On its discharge stroke, each piston supplies fluid under pressure to the associated vibrator cavity.

In operation, the vibrator frequency is much higher than that of the crank, preferably in excess of 10 to 1. This ratio must be high enough so the vibrator plunger linear speed is substantially greater than the maximum linear crank speed. The vibrator relies on the inertia force of the ram mass to perform work. A high pressure hydraulic system is used, so that the hydraulic force acting on piston 81 is adequate to overcome the resiliency and toughness of the hay. If the vibrator piston 82 does not free itself of material on its return stroke, that is, if the material re-expands and maintains contact with the face of the piston 82, the vibrator tends to be smothered. In any case, re-expansion of the material should be avoided as much as possible so as to make recompression of the hay unnecessary. The spring loaded retainers 80 are provided to help limit re-expansion of the hay on the piston return stroke.

The toggle hydraulic actuators receive pressurized fluid from the remaining two cylinders of pump 111. Hose 119, for example, leads to a four-way valve 120, then via line 129 to actuator 121. The return line 122 from actuator 121 leads via four-way valve 120 and line 127 to sump 117. Hose 123 leads from the remaining pump cylinder via four-way valve 124 and line 130 to actuator 125. Return line 126 leads from actuator 125 via four-way valve 124 and line 128 to sump 117. Valves 120 and 124 are identical, as are actuators 121 and 125. Each valve 120 and 124 includes a spring 134 (FIG. 2) that acts against the valve spool (not shown).

*Conveying mechanism*

Figure 1:
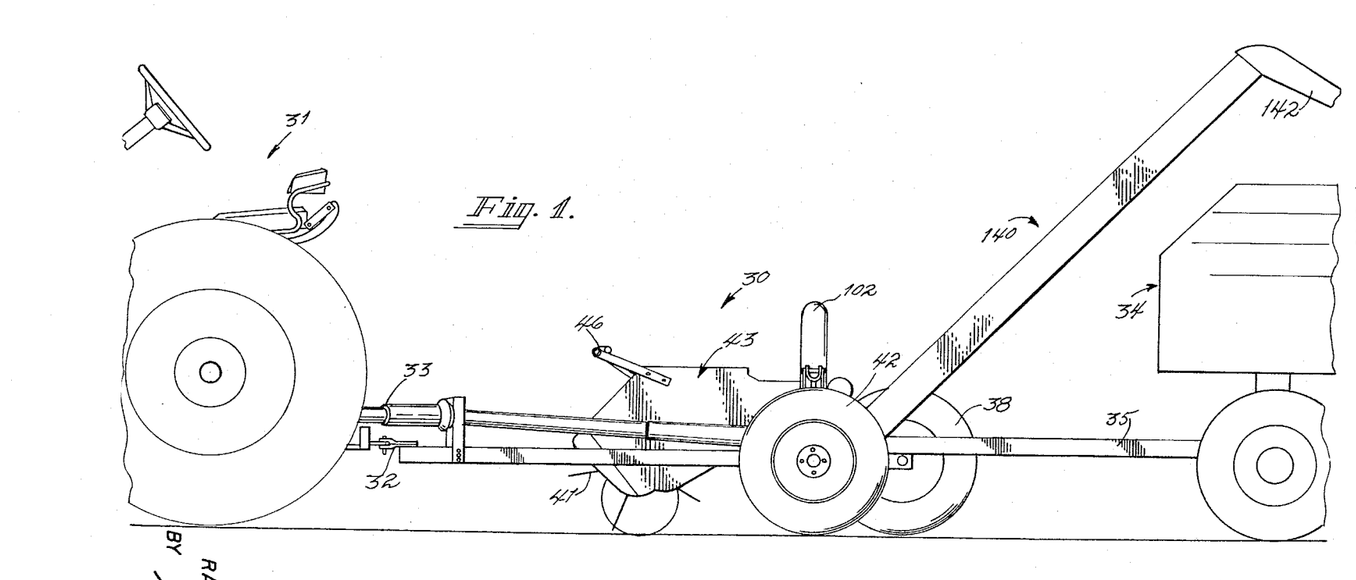
FIG. 1 is a side view of an equipment train using the novel hay waferizer of this invention.
Figure 3:
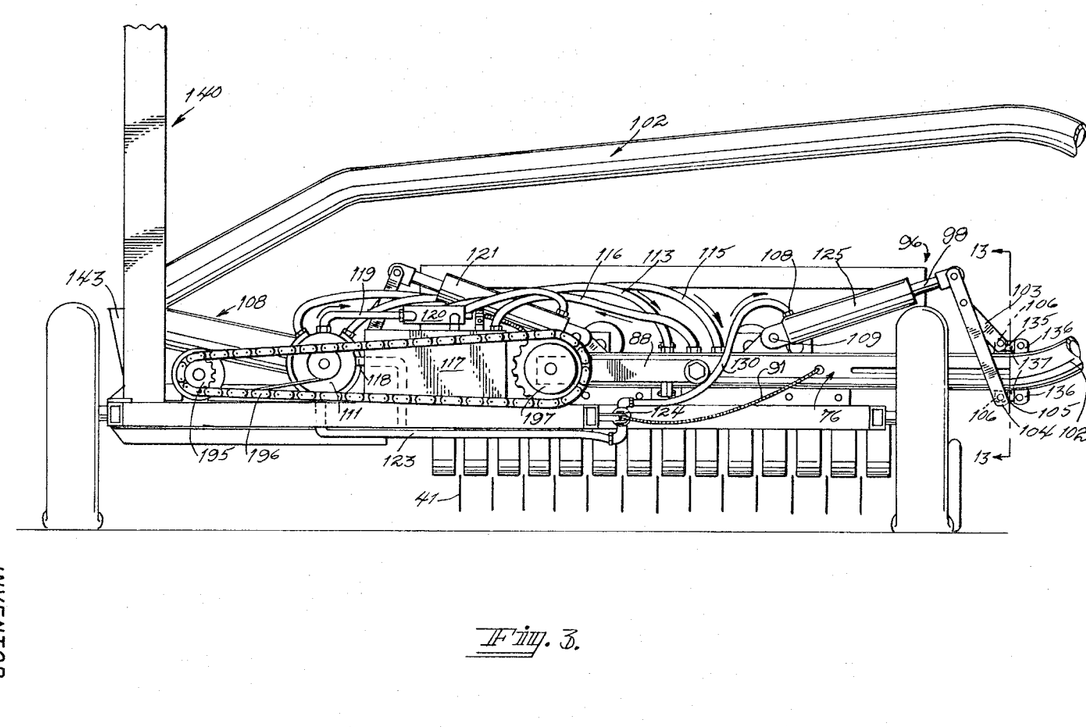
FIG. 3 is a rear view of a hay waferizer of FIG. 1, showing the general location of various major parts.

The conveying mechanism for transferring the wafers from the waferizer to wagon 34 includes the wafer transfer tubes 102 and 108 (FIG. 3) and the elevator conveyor 140 (FIGS. 1 and 3).

Figure 14:
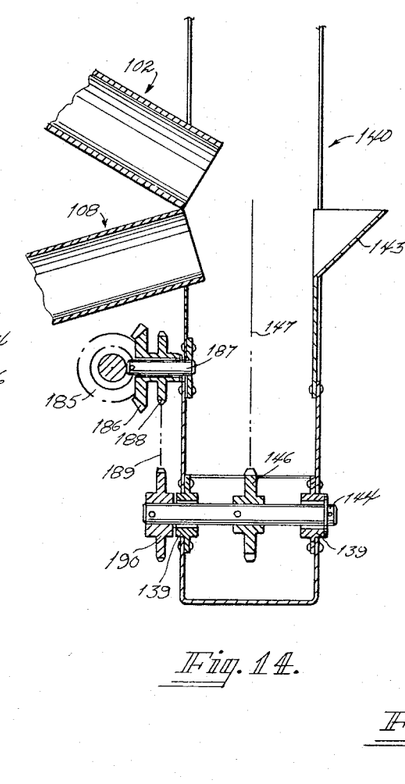
FIG. 14 is a section through the conveyor of FIGS. 1–2, taken on line 14—14 of FIG. 2.

The two wafer transfer tubes convey the completed wafers from the outlet of the third stage of a respective waferizer to the hopper 143 of elevator 140. Tube 102 starts at the end of tube 76 (FIG. 3) and curves back to the other side of the waferizer to the elevator 140. At the elevator (FIG. 14) tube 102 discharges downwardly into a hopper 143 at the base of the elevator. Tube 108 (FIGS. 2 and 3) starts at the other end of tube 76 and extends to the side in a rearwardly and upwardly manner to the hopper 143 (FIG. 14). Tubes 102 and 108 are joined to tube 76 by means of the lugs 106 and 136 and the links 137 (FIGS. 2 and 3). For example, a separate lug 106 is welded to both the top and bottom of tube 76, and a separate lug 136 is welded to both the top and bottom of tube 102. An upper link 137 is bolted to the two top lugs 106 and 136; while a lower link 137 is bolted to the two bottom lugs 106 and 136, thus holding tube 102 in place against the end of tube 76. Similar connections join tube 108 to tube 76.

Wafer transfer tubes 102 and 108 (FIG. 3) have a slightly larger inside diameter than waferizer cylinder 76. Accordingly, tubes 102 and 108 impose less resistance to movement of wafers than does cylinder 76. Unlike prior art waferizers, it is not necessary to subject the wafers to a high pressure in tubes 102 and 108, because the wafers have acquired a sufficient "set" in passing through tube 76 and in being exposed to the vbratory action of piston 82 to hold their shape.

Conveyor 140 (FIGS. 1 and 2) projects upwardly at an incline from the rear of the waferizing machine to deliver finished wafers to the wagon 34. The conveyor comprises a three-sided, U-shaped housing 141 (FIG. 2) rigidly attached to the waferizer and having an adjustable discharge spout 142 (FIG. 1) at the upper end for guiding the wafers into the wagon on turns. At the lower end of the conveyor housing (FIG. 14), bearings 139 for the shaft 144 are located. At the top of the conveyor, a similar shaft for an idler sprocket is located. Sprockets 146 on these shafts carry a chain 147 having attachment elements along its length. Intermediate its ends, chain 147 is supported by a sheet metal floor in housing 141. Sprocket 190 on lower shaft 144 is driven by chain 189, which is driven in turn by sprocket 188 of double gear 186 on stub shaft 187. Gear 186 is driven from the waferizer power system (described below).

*Power train*

Power for operating all components of the waferizer is supplied to waferizer power train 160 (FIG. 15) from the tractor 31 through power take-off (PTO) connection 33. Power train 160 comprises a main drive shaft 161 extending longitudinally of the waferizer and journalled in bearings supported on chassis 37. A telescoping shaft 163 at the forward end of the main drive shaft joins to the tractor PTO connection. The hay pick-up mechanism 40 and the double auger units extract power from the main drive shaft at sprocket 164. The elevator conveyor is driven from the main drive shaft at bevel gear 165. The hydraulic system pump 111 is powered by pulley 166. Power for the second-stage waferizer unit is diverted at sprocket 167.

Power for the pick-up mechanism and the double auger units is transmitted by sprocket 164 to chain 168, thence to sprocket 169 on countershaft 170, mounted alongside housing 43. Countershaft 170 carries a bevel gear 171 for transferring power to the pick-up mechanism, and a sprocket 181 for transferring power to the double auger units.

Bevel gear 171 drives bevel gear 172 and stub shaft 173 and sprocket 174. Power then travels from sprocket 174 to chain 175 and, thence, to sprocket 176 and shaft 177. Shaft 177 then drives sprocket 178 and chain 179, this latter chain in turn driving sprocket 180 attached to the pick-up cylinder shaft 47.

Figure 5:
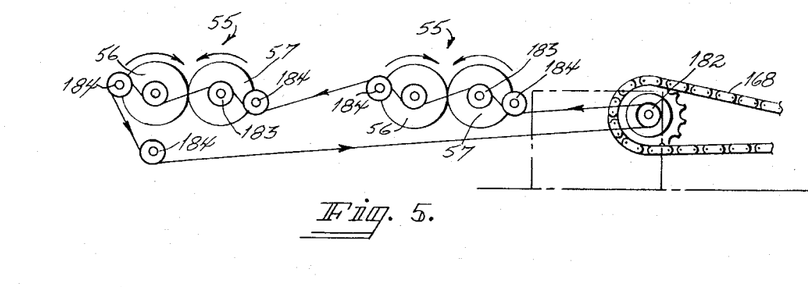
FIG. 5 is a section taken on line 5—5 of FIG. 2, showing part of the power train for first stage, double auger units.

Sprocket 181 for the first-stage double auger units 55 drives chain 182 (FIG. 5). This chain engages the sprockets 183 (on the ends of auger shafts 60) and idler sprockets 184, in the manner shown, to produce counter rotation of the shafts 60.

Figure 7:
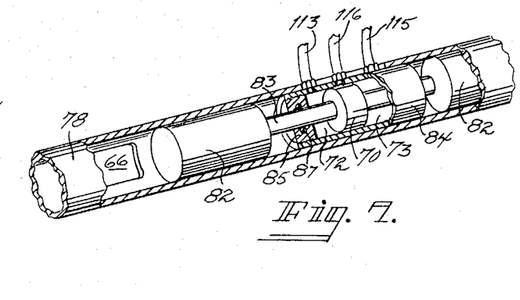
FIG. 7 is an enlarged view of the second stage, double acting piston, showing the internal hydraulic vibrator.

Power for the elevator is transferred from bevel gear 165 to bevel gear 186. Gear 186 then drives shaft 187 and its sprocket 188 (FIG. 7). Chain 189, driven by sprocket 188, transmits power to sprocket 190 on elevator drive shaft 144.

Power for the hydraulic system pump 111 is supplied by pulley 166 to belt drive 192. The latter belt then drives pulley 193 on the pump drive shaft.

Power for the crankshaft 89 is transferred by sprocket 167 on main drive shaft 161 to chain 196. Chain 196 then drives sprocket 197 on crankshaft 89.

OPERATION

The hay waferizer operates as follows: When the tractor power take-off 33 (FIG. 15) drives shaft 163, the various components of the power train function as above described. As the waferizer 30 is moved along a windrow by tractor 31, the pick-up mechanism 40 removes hay from the ground and places it on platform 45. The double auger units 55 induce hay to flow between them, pulling it from the platform through opening 59, and then through chamber 58 to discharge outlet 66. The action of each pair of augers on the hay compacts the hay more or less to bale density, depending upon hay conditions, so that the hay is in a form more conducive for waferizing. In other words, the counter rotation of the augers (FIG. 4) and the opposite hand form of the auger spirals (FIG. 2) effects a compaction of the hay and forces it in the direction of the flow arrows in FIG. 2.

Figure 6:
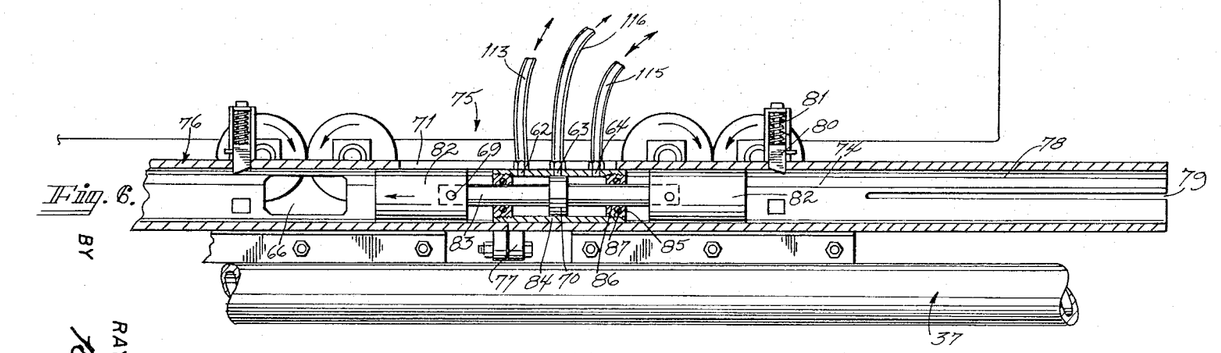
FIG. 6 is a section through one of the second-stage reciprocating, vibratory piston-type wafer forming units, taken on line 6—6 of FIG. 2, showing the means for compressing and tamping the hay into wafers.

As the hay passes through discharge 66, it enters waferizing cylinder 76 (FIG. 6). Piston 82 moves past opening 66 in a compaction stroke, cutting the hay into a wafer charge and compacting it to wafer density. While crank arm 88 reciprocates cross head 84 and the double acting pistons 82, hydraulic fluid is continuously supplied to the vibrator mechanism on the interior of cross head 84.

Figure 9:
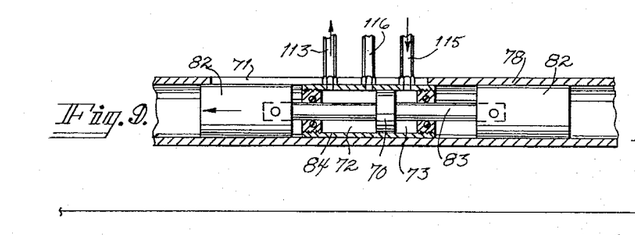
FIGS. 9–11 show three phases of the vibrator action in relation to the action of the second stage piston.
Figure 10:
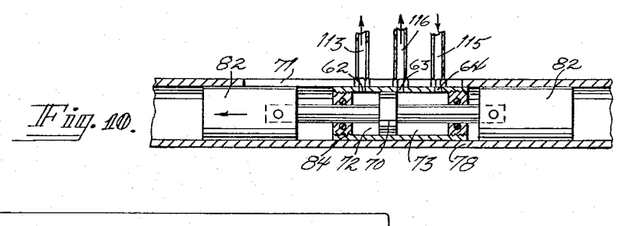
Figure 11:
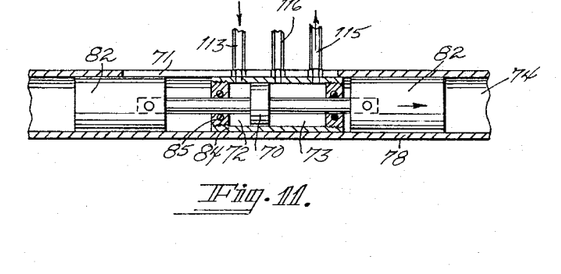

This hydraulic fluid is supplied under pressure by pump 111, alternately from manifolds 112 and 114, at a high frequency and pressure, causing double-acting vibrator piston 70 to reciprocate at a ratio of about 10 to 1 with respect to the reciprocation of cross head 84 and to superimpose a tamping action or secondary reciprocation on the primary reciprocation of the pistons 82. Thus, as cross head 84 moves to the left to compact the wafer in chamber 71 (FIG. 9) pump 111 supplies pressurized fluid via hose 115 to cavity 73 on the right side of double-acting vibrator piston 70, driving the piston 70 to the left and exhausting fluid from cavity 72 through hoses 113, 116. Movement of piston 70 to the left also drives piston 82 leftward to tamp the hay. As piston 70 moves to the left, it passes opening 63 (FIG. 10), whereupon fluid supplied to hose 115 and opening 64 is exhausted through opening 63. The piston 70 continues to move leftward (FIG. 11 under inertia, until the end of the stroke is reached. This occurs when pump 111 supplies fluid under pressure through hose 113 and port 63, into cavity 72, forcing piston 70 to the right. Vibrator piston 70 makes at least ten such strokes for each stroke of cross head 84, tamping the hay and subjecting it to a fatiguing action that reduces its resiliency. As cross head 84 moves to the right on its return stroke, the same action occurs in the right-hand waferizer chamber of cylinder 76.

The finished wafer is forced past the spring actuated retainers 80 (FIG. 6), which prevents the wafer from "breathing" backward. The wafers build up in the slotted area 79 of tube 76, where pressure imparts a "set" to the blades of hay forming each wafer and the heat of friction forms a bond and crust of the hay sap to help hold the wafer together.

Figures 4, 13:
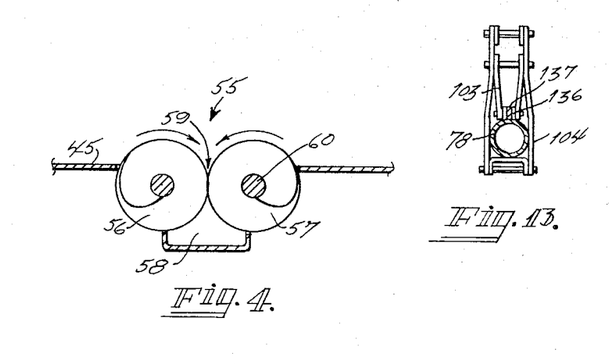
FIG. 4 is a section through one of the first-stage double auger units, taken on line 4—4 of FIG. 2, showing the first compacting chamber.
FIG. 13 is a section through the toggle mechanism of the tube control of FIG. 3, taken on line 13—13 of FIG. 3.

The slotted section 70 of tube 76 is normally held in a restricted or slightly closed position by the toggle mechanisms 96 (FIGS. 3 and 13). As the wafers accumulate in tube 76, the pressure in the tube builds up and is sensed by a flexible element located in the wall of tube 76 and connected to the Bowden wire 91. The Bowden wire operates four-way valve 124, to bleed fluid through hoses 126 and 128 from hydraulic device 125 (FIG. 12) to the sump 117. The toggle mechanism moves arms 103 and 104 counterclockwise (FIG. 3) and opens the split tube to relieve the pressure therein. Drag on the wafers is thereby reduced, allowing them to move forward in the tube. When pressure on the wafers is relieved, the drop in pressure in area of tube slot 79 is transmitted by the Bowden wire 91. Valve 124 (FIG. 12) responds to the signal of the Bowden wire and functions to supply pressurized fluid from pump 111 through hoses 123 and 130 to hydraulic device 125, to actuate the piston therein and its piston rod to move the arms 103 and 104 clockwise to impose a restriction on the flow of wafers through tube 76.

The waferizing action described above occurs in each waferizer chamber 74 and in each slotted tube area 79, producing a steady flow of wafers. As wafers leave the slotted area 79 of tube 76 they enter the enlarged transfer tubes 102 and 108 and are pushed through these tubes by the accumulation of wafers from behind. The wafers fall into the hopper 143 at the bottom of the conveyor 140 on leaving the transfer tubes. The conveyor runs continuously, drawing wafers from the hopper and moving them upward to the discharge spout. Wafers fall from this spout into the wagon.

The above description covers only the preferred mode of the present invention. The invention is, of course, by no means limited to that mode but embraces, as well, all equivalent forms that fall within the spirit and scope of the attached claims. Specific details, where described, are given as illustrations only and are not to be construed as limitations.

What is claimed is:

1. A hay waferizer, comprising: a first-stage unit for compacting hay substantially to bale density; a second-stage unit for forming hay wafers, said second-stage unit including a waferizing cylinder, a hay inlet into said hay waferizing cylinder from said first-stage unit, a waferizer piston in said cylinder, compound drive means connected to said piston for simultaneously imparting thereto a primary reciporcation and a secondary reciprocation, said secondary reciprocation being of greater frequency than said primary reciprocation; and a third-stage unit for imparting a set to hay wafers, said third-stage unit including a tube constituting an extension of said waferizer cylinder.

2. A hay waferizer, comprising: a first-stage feeding unit for compacting hay substantially to bale density, said first-stage unit including at least one pair of augers disposed parallel to one another, said augers having opposite hand spirals offset from one another, drive means connected to said augers for rotation thereof; a second-stage unit for forming hay wafers, said second-stage unit including a waferizer cylinder, a hay inlet into said waferizer cylinder from said first-stage unit, a waferizer piston in said cylinder, compound drive means connected to said piston for simultaneously imparting thereto a primary reciprocation and a secondary reciprocation, said secondary reciprocation being of greater frequency than said primary reciprocation; and a third-stage unit for imparting a set to hay wafers, said third-stage unit including a tube constituting an extension of said waferizing cylinder, the walls of said tube being yieldable for varying the size of the bore thereof from a first position where said bore restricts movement of said wafers, to a second position where said bore is less restricted.

3. A hay waferizer, comprising: a first-stage feeding unit for compacting hay substantially to bale density, said first-stage unit including at least one pair of augers disposed parallel to one another, said augers having opposite end spirals offset from one another, drive means connected to said augers for rotation thereof; a second-stage unit for forming hay wafers, said second-stage unit including a waferizer cylinder, a hay inlet into said waferizer cylinder from said first-stage unit, a waferizer piston in said cylinder, a closed vibrator cylinder supported for reciprocation, means connected to said vibrator cylinder for reciprocation thereof, a double-acting vibrator piston in said vibrator cylinder, a piston rod opening in wall of said vibrator cylinder adjacent said waferizer piston, a connecting rod exteding through said opening and connected to said waferizer piston and to said vibrator piston, a first fluid opening into said vibrator cylinder to one side of said vibrator piston, a second fluid opening into said vibrator cylinder to the other side of said vibrator piston; a third-stage unit for imparting a set to hay wafers, said third-stage unit including a tube constituting an extension of said waferizer cylinder, the wall of said tube being yieldable for varying the size of the bore thereof from a first position where said bore restricts movement of said wafers, to a second position where said bore is less restricted.

4. A hay waferizer, comprising: a first-stage feeding unit for compacting hay substantially to bale density, said first-stage unit including at least one pair of augers disposed parallel to one another, said augers having opposite hand spirals offset from one another, drive means connected to said augers for rotation thereof; a second-stage unit for forming hay wafers, said second-stage unit including a waferizer cylinder, a hay inlet into said waferizer cylinder from said first-stage unit, a waferizer piston in said cylinder, a closed vibrator cylinder supported for reciprocation, means connected to said vibrator cylinder for reciprocation thereof, a double-acting vibrator piston in said vibrator cylinder, a piston rod opening in a wall of said vibrator cylinder adjacent said waferizer piston, a connecting rod extending through said opening and connected to said waferizer piston and to said vibrator piston, a first fluid opening into said vibrator cylinder to one side of said vibrator piston, a second fluid opening into said vibrator cylinder to the other side of said vibrator piston; a third-stage unit for imparting a set to hay wafers, said third-stage unit including a tube constituting an extension of said waferizer cylinder, said tube normally having a bore of substantially the same size as the bore of said waferizer cylinder, said tube having at least one slot extending longitudinally thereof for varying the size of its bore from a first position where movement of hay wafers through said tube is restricted, to a second position where said bore is less restricted, a clamping mechanism on said tube adjacent said slotting for varying the size of said bore from said first position to said second position.

5. A hay waferizer comprising: a first-stage feeding unit for compacting hay substantially to bale density, said first-stage unit including a platform with an opening formed therein, a pair of augers rotatably mounted in said opening, said augers being disposed parallel to one another, the spirals on said augers being of opposite hands and timed about 180° apart, a housing forming a compaction chamber enclosing said augers and extending longitudinally thereof, said opening forming an inlet into said chamber, an outlet from said chamber adjacent one end thereof, drive means connected to said augers for counter rotation thereof; a second-stage unit for forming hay wafers, said second-stage unit including a waferizer cylinder, a hay inlet into said waferizer cylinder communicating with said first-stage outlet, a waferizer piston in said cylinder, a closed vibrator cylinder, a crank arm connected to said vibrator cylinder for reciprocating said vibrator cylinder, a double-acting vibrator piston in said cylinder, a piston rod opening in a wall of said vibrator cylinder adjacent said waferizer piston, a connecting rod extending through said opening and connected to said waferizer piston and to said vibrator piston, a first fluid opening into said vibrator cylinder to one side of said vibrator piston, a second fluid opening into said vibrator cylinder to the other side of said vibrator piston, hydraulic means connected to said fluid openings for reciprocating said vibrator piston at a greater frequency than said vibrator cylinder is reciprocated; a third-stage unit for imparting a set to hay wafers, said third-stage unit including a tube constituting an extension of said waferizer cylinder, said tube normally having a bore of substantially the same size as the bore of said waferizer cylinder, said tube having at least one slot extending longitudinally thereof for varying the size of its bore from a first position where movement of hay wafers through said tube is restricted, to a second position where said bore is less restricted, a clamping mechanism on said tube adjacent said slotting for varying the size of said bore from said first position to said second position.

6. A hay waferizer, comprising: a first-stage feeding unit for compacting hay substantially to bale density; a second-stage unit for forming hay wafers, said second-stage unit including a waferizer cylinder, a hay inlet into said waferizer cylinder from said first-stage unit, a waferizer piston in said cylinder, a closed vibrator cylinder in said waferizer cylinder, a crank arm connected to said vibrator cylinder, a double-acting vibrator piston in said vibrator cylinder, a piston rod opening in a wall of said vibrator cylinder adjacent said waferizer piston, a connecting rod extending through said opening connected to said waferizer piston and to said vibrator piston, a first fluid opening into said vibrator cylinder to one side of said vibrator piston, a second fluid opening in said vibrator cylinder to the other side of said vibrator piston, hydraulic means connected to said fluid openings for reciprocating said vibrator piston at a greater frequency than said vibrator cylinder is reciprocated; a third-stage unit for imparting a set to hay wafers, said third-stage unit including a tube constituting an extension of said waferizer cylinder, said tube normally having a bore of substantially the same size as the bore of said waferizer cylinder, said tube having at least one slot extending longitudinally thereof for varying the size of its bore from a first position where movement of hay wafers through said tube is restricted, to a second position where said bore is less restricted, a clamping mechanism on said tube adjacent said slotting for varying the size of said bore from said first position to said second position.

7. A hay waferizer, comprising: a first-stage feeding unit for compacting hay substantially to bale density; a second-stage unit for forming hay wafers, said second-stage unit including a waferizer cylinder, a hay inlet into said waferizer cylinder from said first-stage unit, a waferizer piston in said cylinder, a closed vibrator cylinder supported for reciprocation, means connected to said vibrator cylinder for reciprocation thereof, a double-acting vibrator piston in said vibrator cylinder, a piston rod opening in a wall of said vibrator cylinder adjacent said waferizer piston, a connecting rod extending through said opening and connected to said waferizer piston and to said vibrator piston, a first fluid opening into said vibrator cylinder to one side of said vibrator piston, a second fluid opening into said vibrator cylinder to the other side of said vibrator piston; a third-stage unit for imparting a set to hay wafers, said third-stage unit including a tube constituting an extension of said waferizer cylinder, said tube normally having a bore of substantially the same size as the bore of said waferizer cylinder, said tube having at least one slot extending longitudinally thereof for varying the size of its bore from a first position where movement of hay wafers through said tube is restricted, to a second position where said bore is less restricted, a clamping mechanism on said tube adjacent said slot for varying the size of said bore from said first position to said second position.

8. A hay waferizer, comprising: a first-stage feeding unit for compacting hay substantially to bale density; a second-stage unit for forming hay wafers, said second-stage unit including a waferizer cylinder, a hay inlet into said waferizer cylinder from said first-stage unit, a waferizer piston in said cylinder, compound drive means connected to said piston for simultaneously imparting thereto a primary reciprocation and a secondary reciprocation, said secondary reciprocation being of greater frequency than said primary reciprocation; a third-stage unit for imparting a set to hay wafers, said first-stage unit including a tube constituting an extension of said waferizer cylinder, the wall of said tube being yieldable for varying the size of the bore thereof from a first position where said bore restricts movement of said wafers to a second position where said bore is less restricted.

9. A hay waferizer, comprising: a first-stage feeding unit for compacting hay substantially to bale density; a second-stage unit for forming hay wafers, said second-stage unit including a waferizer cylinder, a hay inlet into said waferizer cylinder from said first-stage unit, a waferizer piston in said cylinder, a closed vibrator cylinder supported for reciprocation, means connected to said vibrator cylinder for reciprocation thereof, a double-acting vibrator piston in said vibrator cylinder, a piston rod opening in a wall of said vibrator cylinder adjacent said waferizer piston, a connecting rod extending through said opening and connected to said waferizer piston and to said vibrator piston, a first fluid opening into said vibrator cylinder to one side of said vibrator piston, a second fluid opening into said vibrator cylinder to the other side of said vibrator piston; a third-stage unit for imparting a set to hay wafers, said third-stage unit including a tube constituting an extension of said waferizer cylinder, the wall of said tube being yieldable for varying the size of the bore thereof from a first position where said bore restricts movement of said wafers, to a second position where said bore is less restricted.

10. A hay waferizer, comprising: a first-stage feeding unit for compacting hay substantially to bale density, said first-stage unit including a pair of augers disposed parallel to one another, said augers having opposite hand spirals offset from one another, drive means connected to said augers for rotation thereof; a second-stage unit for forming hay wafers, said second-stage unit including a waferizer cylinder, a hay inlet into said waferizer cylinder from said first-stage unit, waferizer piston in said cylinder, compound drive means connected to said piston for simultaneously imparting thereto a primary reciprocation and a secondary reciprocation, said secondary reciprocation being of greater frequency than said primary reciprocation; a third-stage unit for imparting a set to hay wafers, said third-stage unit including a tube constituting an extension of said waferizer cylinder, said tube normally having a bore of substantially the same size as the bore of said waferizer cylinder, said tube having at least one slot extending longitudinally thereof for varying the size of its bore from a first position where movement of hay wafers through said tube is restricted, to a second position where said bore is less restricted, a clamping mechanism on said tube adjacent said slotting for varying the size of said bore from said first position to said second position.

11. A hay waferizer, comprising: a first-stage feeding unit for compacting hay substantially to bale density; a second-stage unit for forming hay wafers, said second-stage unit including a waferizer cylinder, a hay inlet into said waferizer cylinder from said first-stage unit, a waferizer piston in said cylinder, compound drive means connected to said piston for simultaneously imparting thereto a primary reciprocation and a second reciprocation, said secondary reciprocation being of greater frequency than said primary reciprocation.

12. A hay waferizer, comprising: a first-stage feeding unit for compacting hay substantially to bale density, said first-stage unit including at least one pair of augers disposed parallel to one another, said auger flights having opposite hand spirals offset from one another, drive means connected to said augers for rotation thereof; a second-stage unit for forming hay wafers, said second-stage unit including a waferizer cylinder, a hay inlet into said waferizer cylinder from said first-stage unit, a waferizer piston in said cylinder, compound drive means connected to said piston for simultaneously imparting thereto a primary reciprocation and a secondary reciprocation, said secondary reciprocation being of greater frequency than said primary reciprocation.

13. A hay waferizer, comprising: a first-stage feeding unit for compacting hay substantially to bale density, said first-stage unit including at least one pair of augers disposed parallel to one another, said augers having flights of opposite hand spirals offset from one another, drive means connected to said augers for rotation thereof; a second-stage unit for forming hay wafers, said second-stage unit including a waferizer cylinder, a hay inlet into said waferizer cylinder from said first-stage unit, a waferizer piston in said cylinder, a closed vibrator cylinder supported for reciprocation, means connected to said vibrator cylinder for reciprocation thereof, a double-acting vibrator piston in said vibrator cylinder, a piston rod opening in a side of said vibrator cylinder adjacent said waferizer piston, a connecting rod extending through said opening and connected to said waferizer piston and to said vibrator piston, a first fluid opening into said vibrator cylinder to one side of said vibrator piston, a second fluid opening into said vibrator cylinder to the other side of said vibrator piston.

14. A hay waferizer, comprising: a first-stage feeding unit for compacting hay substantially to bale density; a second-stage unit for forming hay wafers, said second-stage unit including a waferizer cylinder, a hay inlet into said waferizer cylinder from said first-stage unit, a waferizer piston in said cylinder, a closed vibrator cylinder supported for reciprocation, means connected to said vibrator cylinder for reciprocation thereof, a double-acting vibrator piston in said vibrator cylinder, a piston rod opening in a wall of said vibrator cylinder adjacent said waferizer piston, a connecting rod extending through said opening and connected to said waferizer piston and to said vibrator piston, a first fluid opening into said vibrator cylinder to one side of said vibrator piston, a second fluid opening into said vibrator cylinder to the other side of said vibrator piston.

15. A hay waferizer, comprising: a compaction unit for forming hay wafers, said unit including a waferizer cylinder, a hay inlet into said waferizer cylinder, a waferizer piston in said cylinder, a compound drive means connected to said piston for simultaneously imparting thereto a primary reciprocation and a secondary reciprocation, said secondary reciprocation being of greater frequency than said primary reciprocation; a holding unit for imparting a set to hay wafers, said holding unit including a tube constituting an extension of said waferizer cylinder, said tube normally having a bore of substantially the same size as the bore of said waferizer cylinder, said tube having at least one slot extending longitudinally thereof for varying the size of its bore from a first position where movements of hay wafers through said tube is restricted, to a second position where said bore is less restricted, a clamping mechanism on said tube adjacent said slotting for varying the size of said bore from said first position to said second position.

16. A hay waferizer, comprising: a unit for forming hay wafers, said unit including a waferizer cylinder, a hay inlet into said waferizer cylinder, a waferizer piston in said cylinder, a closed vibrator cylinder supported for reciprocation, means connected to said vibrator cylinder for reciprocation thereof, a double-acting vibrator piston in said vibrator cylinder, a piston rod opening in a wall of said vibrator cylinder adjacent said waferizer piston, a connecting rod extending through said opening and connected to said waferizer piston and to said vibrator piston, a first fluid opening into said vibrator cylinder to one side of said vibrator piston, a second fluid opening into said vibrator cylinder to the other side of said vibrator piston; a holding unit for imparting a set to hay wafers, said holding unit including a tube constituting an extension of said waferizer cylinder.

17. A hay waferizer, comprising: a unit for forming hay wafers, said unit including a waferizer cylinder, a hay inlet said waferizer cylinder, a waferizer piston in said cylinder, a closed vibrator cylinder supported for reciprocation, means connected to said vibrator cylinder for reciprocation thereof, a double-acting vibrator piston in said vibrator cylinder, a piston rod opening in a wall of said vibrator cylinder adjacent said waferizing piston, a connecting rod extending through said opening and connected to said waferizer piston and to said vibrator piston, a first fluid opening into said vibrator cylinder to one side of said vibrator piston, a second fluid opening into said vibrator cylinder to the other side of said vibrator piston; a holding unit for imparting a set of hay wafers, said holding unit including a tube constituting an extension of said waferizer cylinder, said tube normally having a bore of substantially the same size as the bore of said waferizer cylinder, said tube having at least one slot extending longitudinally thereof for varying the size of its bore from the first position where movement of hay wafers through said tube is restricted, to a second position where said bore is less restricted, a clamping mechanism on said tube adjacent said slotting for varying the size of said bore from said first position to said second position.

18. A hay waferizer, comprising: a hay compaction unit for forming hay wafers, said hay compaction unit including a waferizer cylinder, a hay inlet into said waferizer cylinder, a waferizer piston in said cylinder, compound drive means connected to said piston for simultaneously imparting thereto a primary reciprocation and a secondary reciprocation, said secondary reciprocation being of greater frequency than said primary reciprocation; a holding unit for imparting a set to hay wafers, said holding unit including a tube constituting an extension of said waferizer cylinder.

19. A hay waferizer, comprising: a first-stage unit for compacting hay substantially to bale density; a second-stage unit for forming hay wafers, said second-stage unit including a waferizer cylinder, a hay inlet into said waferizer cylinder from said first-stage unit, a waferizer piston in said cylinder, a cross head reciprocable in said cylinder, said cross head including a closed vibrator cylinder, a double-acting vibrator piston in said vibrator cylinder, a piston rod opening in a wall of said vibrator cylinder facing said waferizer piston, a connecting rod extending through said opening and connected to said waferizer piston and to said vibrator piston, a first fluid opening into said vibrator cylinder to one side of said vibrator piston, a second fluid opening into said vibrator cylinder to the other side of said vibrator piston, means fluidly connected to said first and said second fluid openings for alternately supplying pressurized fluid to said openings, a fluid discharge opening in said vibrator cylinder intermediate said first and said second vibrator cylinder openings, and crank means connected to said cross head for reciprocation thereof.

20. A hay waferizer, comprising: a first-stage unit for compacting hay substantially to bale density; a double-acting second-stage unit for forming hay wafers, said second-stage unit including a waferizing cylinder, a pair of hay inlets into said hay waferizing cylinder from said first-stage unit, a double-acting waferizer piston in said cylinder, compound drive means connected to said piston for simultaneously importing thereto during each of said actions a primary reciprocation and a secondary reciprocation, said secondary reciprocation being of greater frequency than said pimary reciprocation.

21. A hay waferizer, comprising: a first-stage feeding unit for compacting hay substantially to bale density, said first-stage unit including a first and a second pair of augers, the augers of each pair being disposed parallel to one another and having opposite hand spirals offset from one another, drive means connected to said augers for rotation thereof; a double-acting second-stage unit for forming hay wafers, said second-stage unit including a waferizer cylinder, a hay inlet into said hay waferizing cylinder from each said pair of augers, a double-acting waferizer piston in said cylinder, compound drive means connected to said piston for simultaneously importing thereto during each of said actions a primary reciprocation and a secondary reciprocation, said secondary reciprocation being of greater frequency than said primary reciprocation.

22. A hay waferizer, comprising: a first-stage feeding unit for compacting hay substantially to bale density, said first-stage unit including at least one pair of augers disposed parallel to one another, said augers having opposite hand spirals offset from one another, drive means connected to said augers for rotation thereof; a double-acting second-stage unit for forming hay wafers, said second-stage unit including a waferizer cylinder, a pair of hay inlets into said waferizer cylinder from said first-stage unit, a pair of waferizer pistons in said cylinder, a closed vibrator cylinder in said waferizer cylinder, a crank arm connected to said vibrator cylinder, a double-acting vibrator piston in said vibrator cylinder, a piston rod opening in both ends of said vibrator cylinder adjacent each said waferizer pistons, a connecting rod extending through said openings and connected to said vibrator piston and to each said waferizing pistons, a first fluid opening into said vibrator cylinder to one side of said vibrator piston, a second fluid opening in said vibrator cylinder to the other side of said vibrator piston, hydraulic means fluid connected to said fluid openings for reciprocating said vibrator piston at a greater frequency than said vibrator cylinder is reciprocated.

23. A hay waferizer comprising: a first-stage feeding unit for compacting hay substantially to bale density, said first-stage unit including a platform with at least one opening therein, a pair of augers rotatably mounted in each said opening, each said pair of augers being disposed parallel to one another, the spirals on each said pair of augers being of opposite hands and timed about 180° apart, a housing forming a compaction chamber partially enclosing each said pair of augers below said platform and extending longitudinally thereof, each said opening forming an inlet into each said respective chamber, an outlet from each said chamber adjacent one end thereof, drive means connected to each said pair of augers for counter rotation thereof; a double-acting second-stage unit for forming hay wafers, said second-stage unit including a waferizer cylinder, a pair of hay inlets into said waferizer cylinder from said first-stage unit, a pair of waferizer pistons in said cylinder, a cross head reciprocable in said cylinder intermediate said waferizer pistons, a crank arm connected to said cross head, said cross head including a closed vibrator cylinder disposed longitudinally of said waferizer cylinder and reciprocable with said cross head, a double-acting vibrator piston in said vibrator cylinder, a piston rod opening in both ends of said vibrator cylinder adjacent each said waferizer piston, a connecting rod extending through said openings and connected to said vibrator piston and to each said waferizer pistons, a first fluid opening into said vibrator cylinder to one side of said vibrator piston, a second fluid opening into said vibrator cylinder to the other side of said vibrator piston, a fluid discharge opening into said vibrator cylinder intermediate said first and said second vibrator cylinder openings, and hydraulic means fluidly connected to said fluid openings for reciprocating said vibrator piston at a greater frequency than said vibrator cylinder is reciprocated.

24. A hay waferizer comprising: a first-stage feeding unit for compacting hay substantially to bale density, said first-stage unit including a platform with two openings formed therein, a pair of augers rotatably mounted in each said opening, each said pair of augers being disposed parallel to one another, the spirals on each said pair of augers being of opposite hands and timed about 180° apart, a housing forming a compaction chamber partially enclosing each said pair of augers and extending longitudinally thereof, each said opening forming an inlet into said respective chamber, an outlet from each said chamber adjacent one end thereof, drive means connected to each said pair of augers for counter rotation thereof; a double-acting second-stage unit for forming hay wafers, said second-stage unit including a waferizer cylinder, a separate hay inlet into said waferizer cylinder from each said first-stage chamber outlet, a pair of waferizer pistons in said cylinder, a cross head reciprocable in said cylinder intermediate said waferizer pistons, a crank arm connected to said cross head, said cross head including a closed vibrator cylinder disposed longitudinally of said waferizer cylinder and reciprocable with said cross head, a double-acting vibrator piston in said vibrator cylinder, a piston rod opening in both ends of said vibrator cylinder adjacent each said waferizer piston, a connecting rod extending through said openings and connected to said vibrator piston and to each said waferizer pistons, a first fluid opening into said vibrator cylinder to one side of said vibrator piston, a second fluid opening into said vibrator cylinder to the other side of said vibrator piston, a fluid discharge opening into said vibrator cylinder intermediate said first and second vibrator cylinder openings, and hydraulic means fluidly connected to said fluid openings for reciprocating said vibrator piston at a greater frequency than said vibrator cylinder is reciprocated.

25. In a hay waferizer, a double-acting unit for forming hay wafers, comprising: a waferizer cylinder, a pair of hay inlets into said waferizer cylinder, a pair of waferizer pistons in said cylinder, a cross head reciprocable in said cylinder intermediate said waferizer pistons, a crank arm connected to said cross head, said cross head including a closed vibrator cylinder disposed longitudinally of said waferizer cylinder and reciprocable with said cross head, a double-acting vibrator piston in said vibrator cylinder, a piston rod opening in both ends of said vibrator cylinder adjacent each said waferizer piston, a connecting rod extending through said openings and connected to said vibrator piston and to each said waferizer pistons, a first fluid opening into said vibrator cylinder to one side of said vibrator piston, a second fluid opening into said vibrator cylinder to the other side of said vibrator piston, a fluid discharge opening into said vibrator cylinder intermediate said first and said second vibrator cylinder openings, and hydraulic means fluidly connected to said fluid openings for reciprocating said vibrator piston at a greater frequency than said vibrator cylinder.

26. In a hay waferizer, a unit for forming hay wafers comprising: a waferizer cylinder, a hay inlet into said waferizer cylinder, a waferizer piston in said cylinder, a cross head reciprocable in said cylinder, a crank arm connected to said cross head, said cross head including a closed vibrator cylinder disposed longitudinally of said waferizer cylinder and reciprocable with said cross head, a double-acting vibrator piston in said vibrator cylinder, a piston rod opening in said vibrator cylinder, a connecting rod extending through said opening and joined to said vibrator piston and to said waferizer piston, a first fluid opening into said vibrator cylinder to one side of said vibrator piston, a second fluid opening to said vibrator cylinder to the other side of said vibrator piston, a fluid discharge opening into said vibrator cylinder intermediate said first and said second vibrator cylinder openings, and hydraulic means fluidly connected to said fluid openings for reciprocating said vibrator piston at a greater frequency than said vibrator cylinder is reciprocated.

References Cited by the Examiner

UNITED STATES PATENTS

| | | |
|---|---|---|
| 906,240 | 12/1908 | Kreger. |
| 1,290,203 | 1/1919 | Kouk _________ 100—186 X |
| 1,490,162 | 4/1924 | Dow. |
| 1,850,284 | 3/1932 | McClurkin et al ___ 100—186 X |
| 2,128,241 | 8/1938 | Goss _______________ 25—12 |
| 2,537,920 | 1/1951 | Smith ______________ 25—12 |
| 2,996,756 | 8/1961 | Korsch et al. __________ 18—5 |
| 3,090,182 | 5/1963 | Johnson et al. __________ 56—1 |

FOREIGN PATENTS 233,148   3/1961   Australia.

LOUIS O. MAASSEL, *Primary Examiner.*